(12) United States Patent
Hinman et al.

(10) Patent No.: US 7,279,629 B2
(45) Date of Patent: Oct. 9, 2007

(54) CLASSIFICATION AND USE OF CLASSIFICATIONS IN SEARCHING AND RETRIEVAL OF INFORMATION

(75) Inventors: Jeremy D. F. Hinman, Palo Alto, CA (US); Rolf W. Kaiser, Redwood City, CA (US); Geoffrey R. Stanfield, Palo Alto, CA (US); Paul Deeds, Berkeley, CA (US); Frank Flannery, San Francisco, CA (US); David Revelli, Berkeley, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/031,286

(22) Filed: Jan. 7, 2005

(65) Prior Publication Data
US 2005/0120868 A1   Jun. 9, 2005

Related U.S. Application Data

(63) Continuation of application No. 09/477,224, filed on Jan. 4, 2000, now Pat. No. 7,022,905, which is a continuation of application No. 09/420,262, filed on Oct. 18, 1999, now abandoned.

(51) Int. Cl.
*G10H 7/00* (2006.01)
*G04B 13/00* (2006.01)
*A63H 5/00* (2006.01)

(52) U.S. Cl. .......................... 84/615; 84/609
(58) Field of Classification Search ............... 84/609, 84/612, 615, 626; 434/307 A
See application file for complete search history.

(56) References Cited

U.S. PATENT DOCUMENTS

| | | | |
|---|---|---|---|
| 5,300,727 A | 4/1994 | Osuga et al. | 84/622 |
| 5,616,876 A * | 4/1997 | Cluts | 84/609 |
| 5,749,081 A * | 5/1998 | Whiteis | 707/102 |
| 5,758,257 A | 5/1998 | Hrez et al. | 455/2 |
| 5,883,326 A | 3/1999 | Goodman et al. | 84/649 |
| 5,969,283 A | 10/1999 | Looney et al. | 84/69 |
| 6,012,051 A * | 1/2000 | Sammon et al. | 706/52 |
| 6,184,884 B1 | 2/2001 | Nagahara et al. | 345/352 |
| 6,192,340 B1 | 2/2001 | Abecassis | 704/270 |
| 6,201,176 B1 | 3/2001 | Yourlo | 84/609 |
| 6,231,347 B1 | 5/2001 | Tsai | 434/307 |

(Continued)

OTHER PUBLICATIONS

Musicmatch and Xing Technology Introduce Musicmatch Jukebox, press release, May 18, 1998.*

*Primary Examiner*—Jeffrey W Donels
(74) *Attorney, Agent, or Firm*—Woodcock Washburn LLP

(57) ABSTRACT

A method and apparatus are provided for classification of information and using the classification information in search and retrieval of information. In one embodiment, musical compositions having various highly subjective characteristics and features are classified according to a schema of objective attributes that are associated with the characteristics and features. Categorizers carry out the classification and create and store attribute information in a database. A search and retrieval system can receive information that characterizes the features of a desired composition and can locate a matching composition. As a result, information having subjective characteristics, such as musical compositions, may be compared and similar musical compositions can be located.

20 Claims, 12 Drawing Sheets

U.S. PATENT DOCUMENTS

| | | | |
|---|---|---|---|
| 6,232,539 B1 * | 5/2001 | Looney et al. | 84/609 |
| 6,356,971 B1 * | 3/2002 | Katz et al. | 710/301 |
| 6,370,513 B1 * | 4/2002 | Kolawa et al. | 705/10 |
| 6,448,987 B1 * | 9/2002 | Easty et al. | 715/834 |
| 2001/0018693 A1 | 8/2001 | Jain et al. | 707/500 |
| 2001/0041944 A1 | 11/2001 | Iori | 700/94 |
| 2002/0045960 A1 | 4/2002 | Phillips et al. | 700/94 |
| 2002/0046315 A1 | 4/2002 | Miller et al. | 711/1 |

* cited by examiner

| Artist | U2 | | | Groover | | andrea |
|---|---|---|---|---|---|---|
| Song | October (2:20) | | | Date | | 09/23/99 09:45 |
| Status | Grooved | | | Groovable ✓ Skips ☐ Explicit ☐ Needs Section ☐ | | |
| Style | Alternative Pop/Rock Post-Punk | | | Style Status | Accurate | |
| Album | October (Track 7) | | | SV_ID | | 1032258 |
| Location | full mp3 | | | Key | | 1012024 |

Section 1 (Begins at 0:00)

| | | Tempo | Activity | Time Signature | Description | Type |
|---|---|---|---|---|---|---|
| Rhythm | Accurate dave | 85 | 1 | 4/4 | Steady | straight 4 |

| | | Density | Weight | Consonance | Melodic Movement |
|---|---|---|---|---|---|
| Zing | Accurate clyde | 78 | 22 | 0.66 | 7.3 |

| | | Emotion | Mood | Mood Description |
|---|---|---|---|---|
| Mood | Accurate judy | 4.82 | 40 | Depressing |

Twist — Accurate — andrea

| Vocals | | Flavor | Language |
|---|---|---|---|
| Vocal | Description | | |
| male lead | Sultry | Latin | English |
| -- | -- | French | Spanish |
| -- | -- | German | French |
| -- | -- | Asian | German |
| -- | -- | Indian | Japanese |
| -- | -- | Irish | Arabic |
| | | African | African |
| | | Caribbean | Other |
| | | Middle Eastern | |
| | | Native American | |
| | | Western | |
| | | Euro | |

Save

FIG. 4A

Factor Editor

Welcome, User

Add New Factor Set  —480

Goto factor set: [Default ▼] [Select] —482

**Now Editing Factor Set *Default*:** —484

| Default | |
|---|---|
| Value | —486 |
| song_emotion | 70 |
| song_mood | 32 |
| song_mood_desc | .125 |
| song_density | 33 |
| song_weight | 0.04 |
| song_consonance | 22 |
| song_melodic_movement | 2 |
| song_tempo | 999 |
| song_rhythm_activity | 3.78 |
| song_rhythm_time | .1 |
| song_rhythm_desc | 69 |
| song_rhythm_type | .4 |
| song_subgenre | 0.2 |
| song_style | 7 |
| song_vocal_code | 33 |
| [Update Factor Set Default] | |

CLASSIFICATION AND USE OF CLASSIFICATIONS IN SEARCHING AND RETRIEVAL OF INFORMATION

REFERENCE TO RELATED APPLICATIONS

This is a continuation of application Ser. No. 09/477,224, filed Jan. 4, 2000, now U.S. Pat. No. 7,022,905 which is a continuation of application Ser. No. 09/420,262, filed Oct. 18, 1999, now abandoned.

FIELD OF THE INVENTION

The present invention relates to classification of information and the use of classifications in searching and retrieval of information. The invention relates more specifically to classification of musical compositions and retrieving information about one or more musical compositions that are qualitatively similar to a first musical composition.

BACKGROUND OF THE INVENTION

Classifying information that has subjectively perceived attributes or characteristics is difficult. When the information is one or more musical compositions, classification is complicated by the widely varying subjective perceptions of the musical compositions by different listeners. One listener may perceive a particular musical composition as "hauntingly beautiful" whereas another may perceive the same composition as "annoyingly twangy."

In the classical music context, musicologists have developed names for various attributes of musical compositions. Terms such as adagio, fortissimo, or allegro broadly describe the strength with which instruments in an orchestra should be played to properly render a musical composition from sheet music. In the popular music context, there is less agreement upon proper terminology. Composers indicate how to render their musical compositions with annotations such as brightly, softly, etc., but there is no consistent, concise, agreed-upon system for such annotations.

As a result of rapid movement of musical recordings from sheet music to prerecorded analog media to digital storage and retrieval technologies, this problem has become acute. In particular, as large libraries of digital musical recordings have become available through global computer networks, a need has developed to classify individual musical compositions in a quantitative manner based on highly subjective features, in order to facilitate rapid search and retrieval of large collections of compositions.

Musical compositions and other information are now widely available for sampling and purchase over global computer networks through online merchants such as Amazon.com, Inc., barnesandnoble.com, cdnow.com, etc. A prospective consumer can use a computer system equipped with a standard Web browser to contact an online merchant, browse an online catalog of pre-recorded music, select a song or collection of songs ("album"), and purchase the song or album for shipment direct to the consumer. In this context, online merchants and others desire to assist the consumer in making a purchase selection and desire to suggest possible selections for purchase. However, current classification systems and search and retrieval systems are inadequate for these tasks.

A variety of inadequate classification and search approaches are now used. In one approach, a consumer selects a musical composition for listening or for purchase based on past positive experience with the same artist or with similar music. This approach has a significant disadvantage in that it involves guessing because the consumer has no familiarity with the musical composition that is selected.

In another approach, a merchant classifies musical compositions into broad categories or genres. The disadvantage of this approach is that typically the genres are too broad. For example, a wide variety of qualitatively different albums and songs may be classified in the genre of Popular Music" or "Rock and Roll."

In still another approach, an online merchant presents a search page to a client associated with the consumer. The merchant receives selection criteria from the client for use in searching the merchant's catalog or database of available music. Normally the selection criteria are limited to song name, album title, or artist name. The merchant searches the database based on the selection criteria and returns a list of matching results to the client. The client selects one item in the list and receives further, detailed information about that item. The merchant also creates and returns one or more critics' reviews, customer reviews, or past purchase information associated with the item.

For example, the merchant may present a review by a music critic of a magazine that critiques the album selected by the client. The merchant may also present informal reviews of the album that have been previously entered into the system by other consumers. Further, the merchant may present suggestions of related music based on prior purchases of others. For example, in the approach of Amazon.com, when a client requests detailed information about a particular album or song, the system displays information stating, "People who bought this album also bought . . . " followed by a list of other albums or songs. The list of other albums or songs is derived from actual purchase experience of the system. This is called "collaborative filtering."

However, this approach has a significant disadvantage, namely that the suggested albums or songs are based on extrinsic similarity as indicated by purchase decisions of others, rather than based upon objective similarity of intrinsic attributes of a requested album or song and the suggested albums or songs. A decision by another consumer to purchase two albums at the same time does not indicate that the two albums are objectively similar or even that the consumer liked both. For example, the consumer might have bought one for the consumer and the second for a third party having greatly differing subjective taste than the consumer. As a result, some pundits have termed the prior approach as the "greater fools" approach because it relies on the judgment of others.

Another disadvantage of collaborative filtering is that output data is normally available only for complete albums and not for individual songs. Thus, a first album that the consumer likes may be broadly similar to second album, but the second album may contain individual songs that are strikingly dissimilar from the first album, and the consumer has no way to detect or act on such dissimilarity.

Still another disadvantage of collaborative filtering is that it requires a large mass of historical data in order to provide useful search results. The search results indicating what others bought are only useful after a large number of transactions, so that meaningful patterns and meaningful similarity emerge. Moreover, early transactions tend to over-influence later buyers, and popular titles tend to self-perpetuate.

In a related approach, the merchant may present information describing a song or an album that is prepared and distributed by the recording artist, a record label, or other entities that are commercially associated with the recording. A disadvantage of this information is that it maybe biased, it may deliberately mischaracterize the recording in the hope of increasing its sales, and it is normally based on inconsistent terms and meanings.

Accordingly, there is a need for an improved method of classifying information that is characterized by subjective criteria, such as musical compositions. There is a related need for an improved schema or set of attributes that may be used in such classification.

There is a need for a mechanism that can enable a client to retrieve information about one or more musical compositions and that avoids the disadvantages and drawbacks of the approaches described above.

There is a particular need for a mechanism that can enable a client to retrieve information about one or more musical compositions that are similar to a first musical composition, based on objective indicia of similarity.

SUMMARY OF THE INVENTION

The foregoing needs and objects, and other needs and objects that will become apparent from the following description, are achieved by the present invention, which comprises, in one aspect, a method and apparatus for classification of information and using the classification information in search and retrieval of information. In one embodiment, musical compositions having various highly subjective characteristics and features are classified according to a schema of objective attributes that are associated with the characteristics and features. Categorizers carry out the classification and create and store attribute information in a database. A search and retrieval system can receive information that characterizes the features of a desired composition and can locate a matching composition. As a result, information having subjective characteristics, such as musical compositions, may be compared and similar musical compositions can be located.

According to one aspect, the invention provides a computer-readable medium comprising stored information that describes a first musical composition for use in selecting the first musical composition from among a plurality of other musical compositions that are similar to the first musical composition, wherein the stored information comprises a plurality of classification values that distinguish among features of the musical compositions.

In another aspect, the invention provides a method of creating stored information that describes a first musical composition for use in selecting the first musical composition from among a plurality of other musical compositions that are similar to the first musical composition, according to a plurality of classification values that distinguish among features of similar kinds of musical compositions. In one embodiment, the method involves receiving musical information from the first musical composition and determining its features. A new set of the classification values are created and stored for the first musical composition based on the features that are determined. The new set of classification values are reviewed based on quality control criteria.

In another aspect, a method is provided for matching information that describes a first musical composition to stored information that describes a plurality of other musical compositions that are similar to the first musical composition, wherein the stored information comprises a plurality of classification values that distinguish among features of similar kinds of musical compositions. First musical information that describes the first musical composition and that includes a first set of classification values based on features of the first musical composition is received. Second musical information that describes the plurality of other musical compositions is received and their features are determined. A second set of the classification values are created and stored for the plurality of other musical compositions based on the features that are determined. The first musical information is matched to the second musical information based on the classification values. A list of one or more matching musical compositions is created, wherein the compositions are selected from among the plurality of other musical compositions based on the matching step.

In another aspect, the invention provides a graphical user interface useful for selecting a first musical composition from among a plurality of other musical compositions that are similar to the first musical composition, based on stored information that comprises a plurality of classification values that distinguish among features of the musical compositions, the graphical user interface comprising a plurality of graphical interface widgets that maybe used to select a particular value for each of the classification values.

In still another aspect, a method is provided of matching information that describes a first object to stored information that describes a plurality of other objects that are similar to the first object, wherein the stored information comprises a plurality of classification values that distinguish among features of similar kinds of objects. First information that describes the first object and that includes a first set of classification values based on features of the first object is received. Second information that describes the plurality of other objects and determining their features is received. A second set of the classification values are created and stored for the plurality of other objects based on the features that are determined. The first information is matched to the second information based on the classification values. A list of one or more matching objects is created and stored. The matching objects are selected from among the plurality of other objects based on the matching step.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4A is a diagram of an exemplary graphical user interface that may be used as a form to enter song attributes and voice attributes of a musical composition.

FIG. 4B is a diagram of an exemplary graphical user interface that may be used as a form to edit classification attribute values.

DETAILED DESCRIPTION OF THE PREFERRED EMBODIMENT

A method and apparatus for classification of information and for using the classifications in search and retrieval of information described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Classifying Information

One aspect of the invention relates to classifying information. In this context, "classifying" means creating and storing one or more information values that describe attributes of the information. The information values include values that describe subjective attributes of the information in an objective manner in order to facilitate comparison of two different pieces of information and in order to facilitate identifying pieces of information that are similar.

In one embodiment, the information comprises one or more musical compositions. In this context, "musical composition" or "song" means any audible information, including pre-recorded songs, albums, spoken word material, etc. However, the invention is not limited to this embodiment, and is equally applicable to other information or objects that are normally difficult to classify or describe in objective terms. Examples of other information or objects to which the invention may be applied include motion pictures, television programs, books, beverage, wine, works of art, perfume, game, food, piece of apparel, or even people, such as those who are fashion models, photographers' models, etc.

Figure 1A:
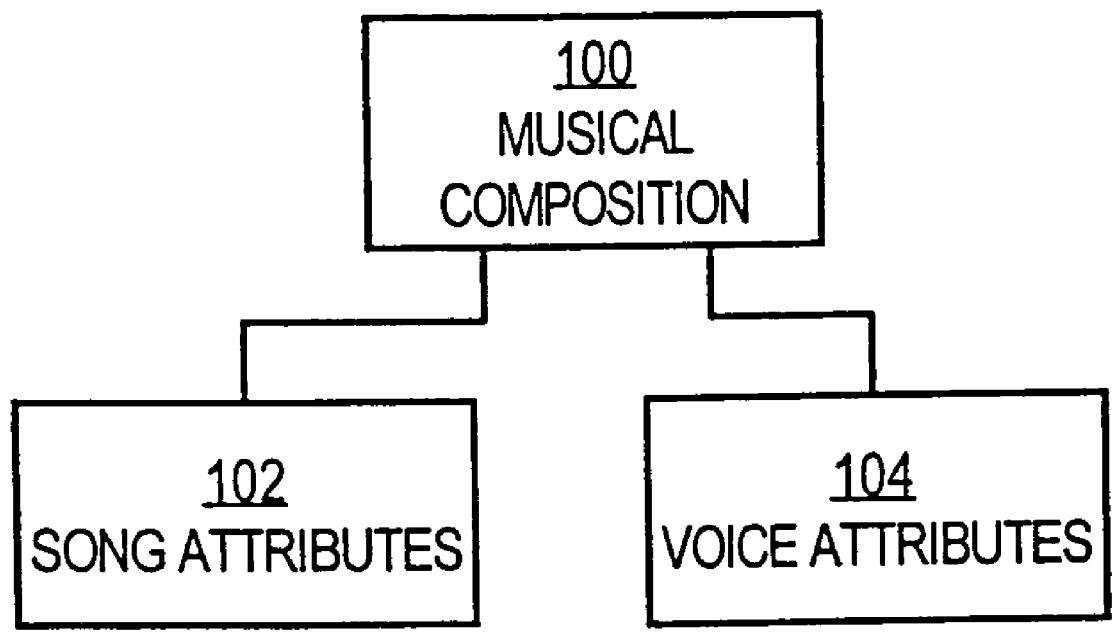
FIG. 1A is a block diagram of categorization information associated with a musical composition.

FIG. 1A is a block diagram of categorization information associated with a musical composition. Musical composition 100 may be classified according to song attributes 102 and voice attributes 104. Song attributes 102 describe characteristics that pertain to the whole of a musical composition. Voice attributes 104 describe characteristics that pertain to individual voices that make up the musical composition. In this context, a "voice" is a human voice, an individual musical instrument, or another discrete sound generating device that is heard in a musical composition. Song attributes 102 and voice attributes 104 are created and stored in the form of one or more digital data values that are created and stored in a non-volatile computer memory device.

Figure 1B:
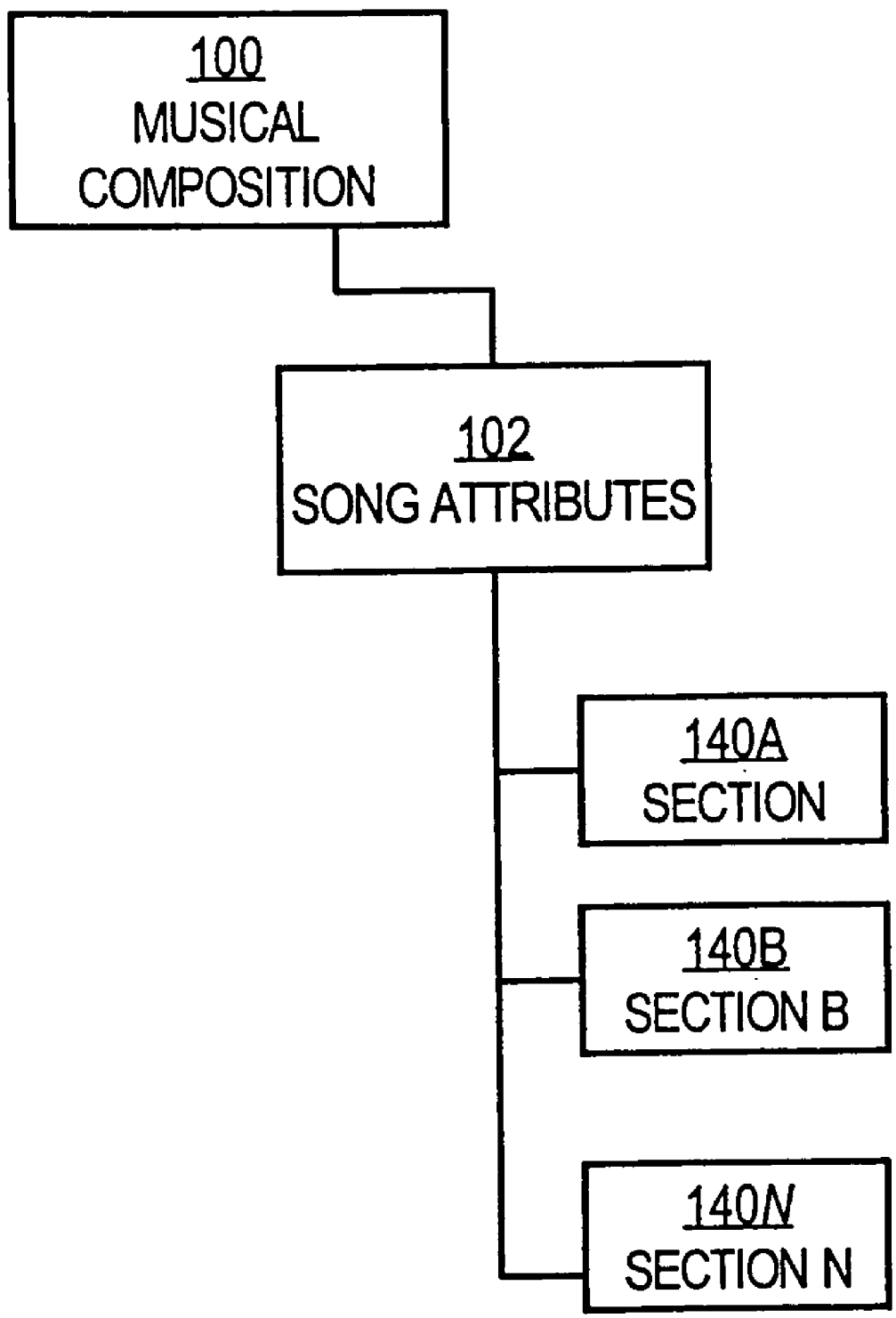
FIG. 1B is a block diagram of sections of categorization information associated with a musical composition.

FIG. 1B is a block diagram of sections of categorization information associated with a musical composition. A musical composition 100 may have a plurality of sections, each of which has different song attributes. For example, a particular song may have a first section that is quiet and slow, followed by a second section that is loud, angry, and rapid. Accordingly, song attributes 102 comprise a plurality of sections 140A, 140B, 140N, etc. There may be any number of sections in a musical composition. Each section 140A, 140B, 140N is associated with a stored set of song attributes that pertain to the associated section.

Figure 1C:
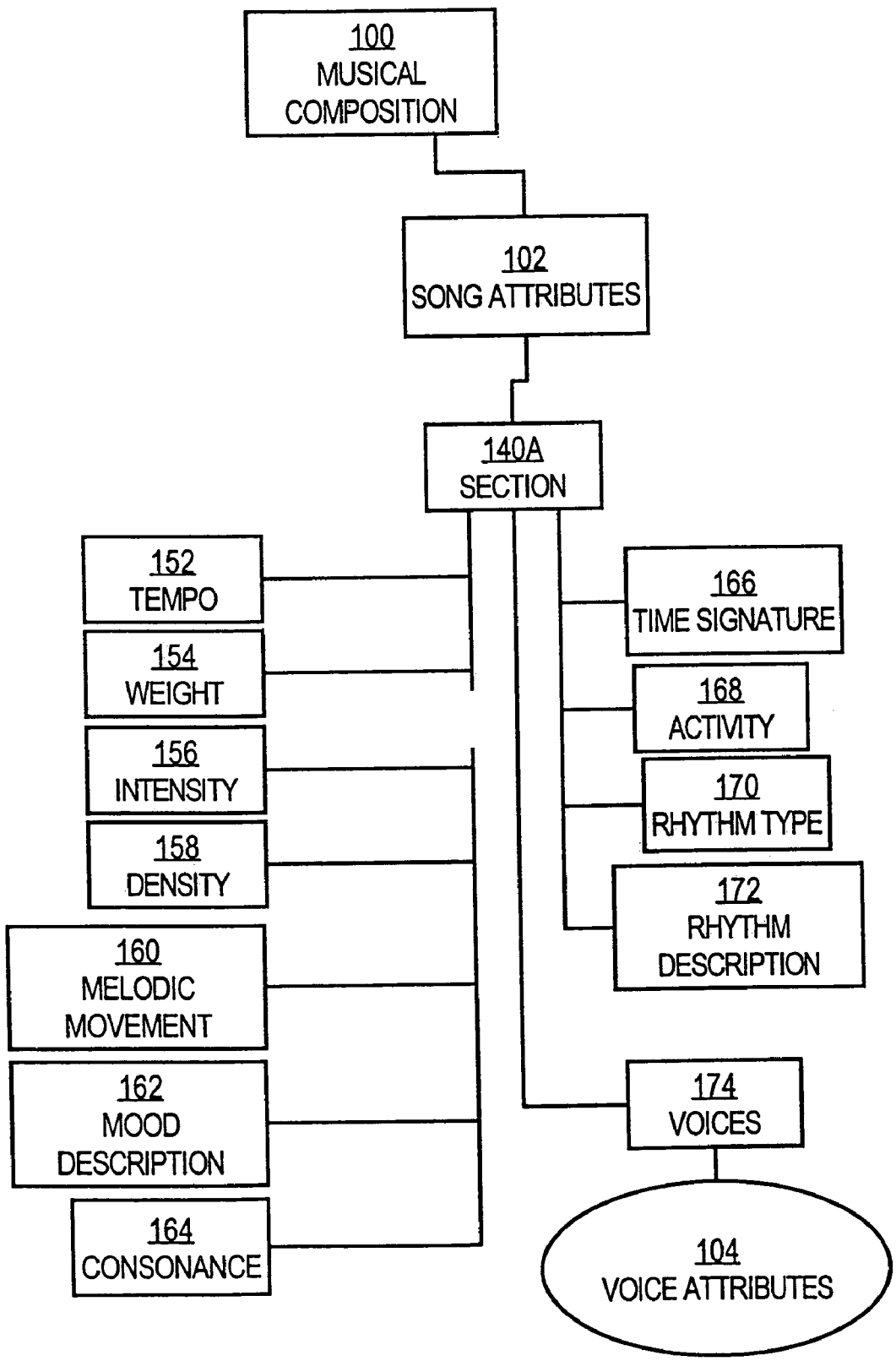
FIG. 1C is a block diagram of song attribute information associated with a musical composition.

FIG. 1C is a block diagram of song attribute information associated with a particular section 140OA of a musical composition. Song attributes 102 for section 14OA may comprise, for example, a Tempo value 152, Weight value 154, Intensity value 156, Density value 158, Melodic Movement value 160, Mood Description value 162, Consonance value 164, Time Signature value 166, Activity value 168, Rhythm Type value 170, Rhythm Description value 172, and Voices value 174.

The foregoing values are examples of values that are suitable for objectively classifying subjective attributes of a song or musical composition, however, embodiments of the invention do not require use of exactly all such values. More or fewer values may be used with equal success.

Tempo value 152 indicates the rate of speed of the musical composition. Activity value 168 indicates the amount of activity that is involved in the rhythm. Time Signature value 166 indicates a time signature that are commonly used in recorded music, e.g., 4/4, 2/4, 9/8, etc. Density value 158 indicates the number of instruments present, and thus the fullness of the sound. Weight value 154 indicates the heaviness of the composition. Consonance value 164 indicates the resolution of the chords present in the composition. Melodic Movement value 160 indicates the degree of movement of the main voice along the musical scale. Mood Description value 162 indicates the overall mood of the song, such as Dreamy, Soothing, Fun, Depressing, Angry, Lonely, Creepy, Groovy, Uplifting, Sexy, etc.

Rhythm Type value 170, in one embodiment, may have a value of Straight 4, Shuffle, Swing, Disco, Reggae, or Hip Hop Shuffle. Rhythm Description value 172, in an embodiment, describes the nature of the rhythm of the song, and may have a value of Rockin', Frenetic, Steady, Throbbing, Free, Funky, Groovy, Syncopated, or Stiff. Mood Description value 162, in an embodiment, is selected from among Dreamy, Soothing, Fun, Depressing, Angry, Lonely, Creepy, Groovy, Uplifting, or Sexy.

Figure 1D:
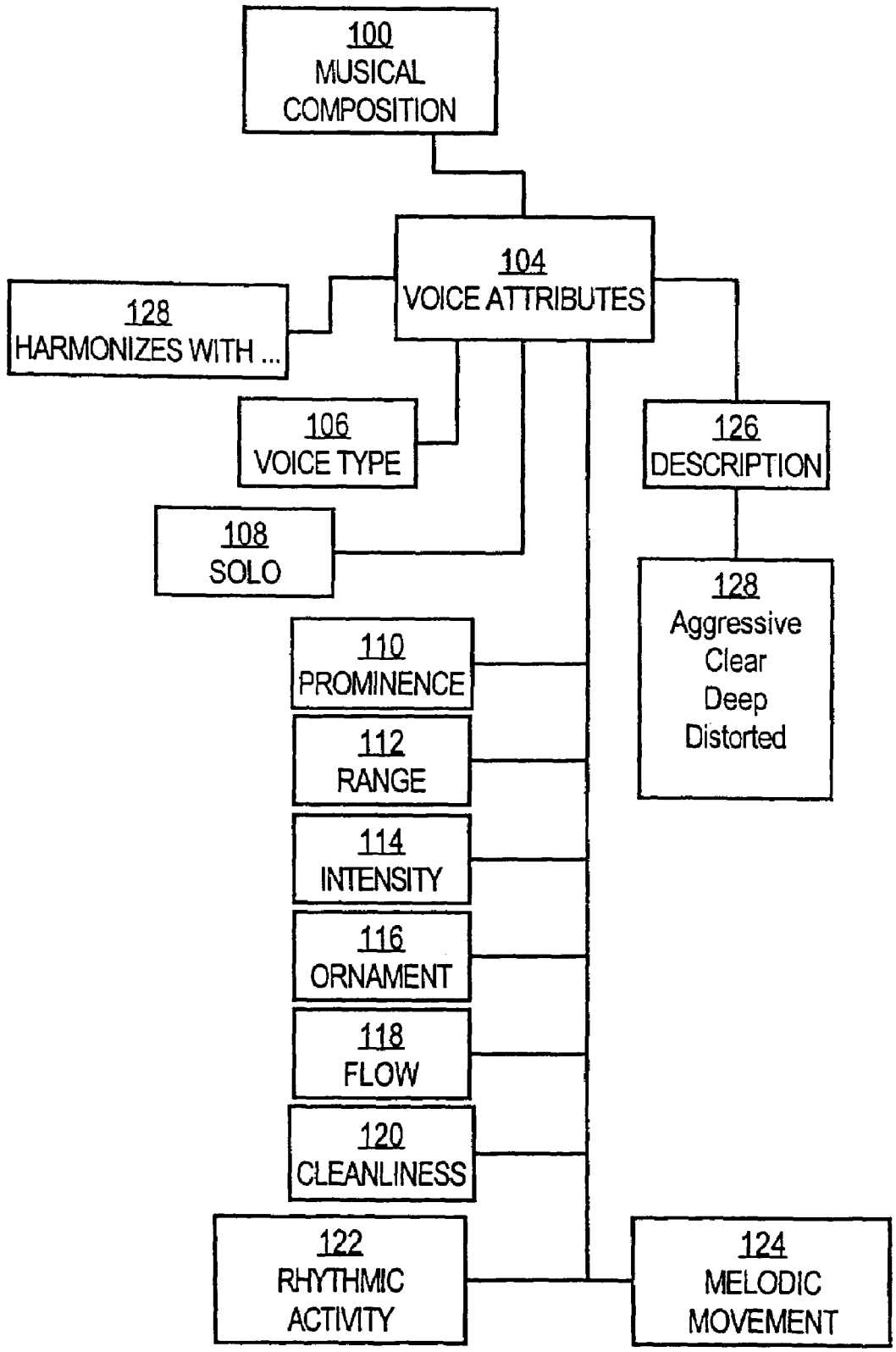
FIG. 1D is a block diagram of voice attribute information associated with a musical composition.

Voice value 174 comprises a list of one or more voices that are present in the musical composition. A set of voice attributes 104 is associated with or linked to each voice that is named in the Voices value 174. FIG. 1D is a block diagram of voice attribute information associated with a musical composition. Voice attributes 104 may comprise, for example, a Voice Type value 106, Solo value 108, Prominence value 110, Range value 112, Intensity value 114, Ornament value 116, Flow value 118, Cleanliness value 120, Rhythmic Activity value 122, Melodic Movement value 124, Description value 126, or Harmonizes With value 128. The foregoing values are examples of values that are suitable for objectively classifying voices in a musical composition, however, embodiments of the invention do not require use of all such values. More or fewer values maybe used with equal success.

Voice Type value 106 identifies a musical instrument, sound-making device, or a kind of a human voice such as Male Lead, Soprano, etc., associated with a voice. Solo value 108, when set, indicates that the associated voice performs solo in the composition. Prominence value 110 indicates quantifies whether the associated voice is heard in the acoustic foreground or background. Range value 112 indicates the breadth of the overall frequency range expressed by the associated voice. Intensity value 114 indicates the strength with which the voice is expressed. Ornament value 116 indicates whether the performance of the instrument is highly. Flow value 118 indicates whether the notes of the voice flow smoothly into one another. Cleanliness value 120 indicates whether the voice is pure or distorted. Rhythmic Activity value 122 indicates whether the rhythm of the song changes rapidly or slowly. Melodic Movement value 124 value indicates the degree of movement of the main voice along the musical scale.

Description value 126, in one embodiment, is selected from among Raspy, Sweet, Sultry, Whiny, Forceful, Aggressive, Monotonous, Clear, Processed, Jangly, Shimmering, Thick, Thin, or Lush.

In one embodiment, voice attributes 104 comprise only values for Range, Intensity, Cleanliness, Rhythmic Activity, or Melodic Movement. In an alternate embodiment, voice attributes 104 additionally comprise values for Prominence, Ornament, or Flow. In another alternate embodiment, voice attributes 104 additionally comprise the Harmonizes With value 128, which identifies a second voice among voices in the list of voices with which a first voice harmonizes.

In one embodiment, the song attributes comprise at least one song attribute value indicating Weight, Intensity, Melodic Movement, Range, Harmony, Density, Cleanliness, Flow, Melodic Movement, Mood Description, Consonance, Mood, and Dynamics. In an alternate embodiment, the song attributes comprise the foregoing attribute values, and also at least one song attribute value indicating Activity, Rhythm, Time Signature, Rhythm Type, or Rhythm Description.

Alternatively, rather than using characterizations of Voices or instruments, a song may be characterized in terms of a plurality of Vocal values, each associated with one of a plurality of Description values 128. Each Vocal value identifies a vocal element that is present in the current musical composition, selected from among a pull-down menu of available kinds of vocal elements. Examples of kinds of vocal elements include Male Lead, Female Lead, Male Backup, Female Backup, Chorus, etc. Each Description value identifies the quality of the associated vocal element. Example Description values include Raspy, Sweet, Sultry, Whiny, Forceful, Aggressive, Monotonous, Clear, Processed, Jangly, Shimmering, Thick, Thin, Lush, etc.

Figure 1E:
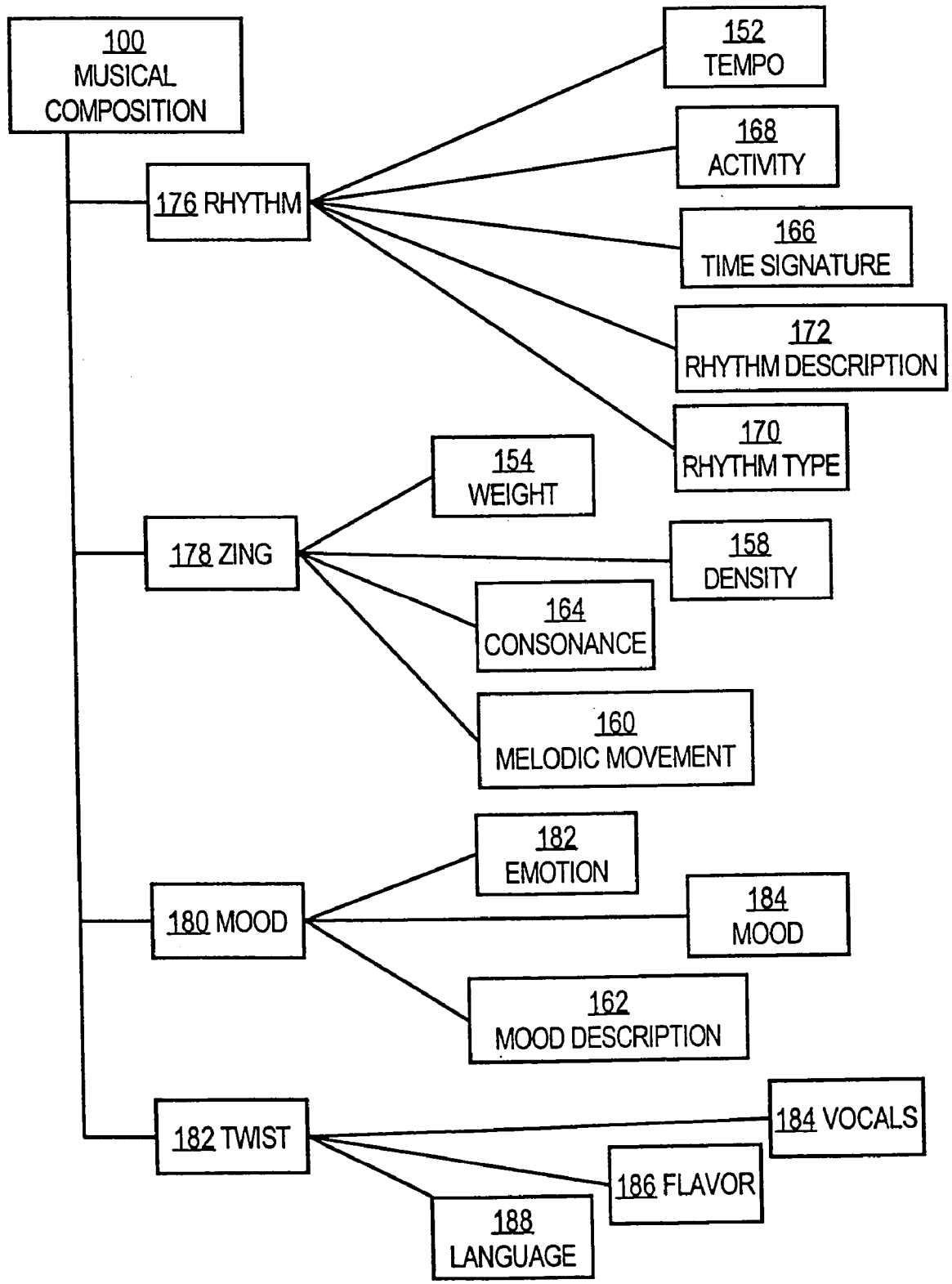
FIG. 1E is a block diagram of an alternate embodiment of classification values that may be associated with a musical composition.

FIG. 1E is a block diagram of an alternate and preferred embodiment of classification values that may be associated with a musical compositions.

A musical composition 100 is associated with Rhythm values 176, Zing values 178, Mood values 180, and Twist values 182. Rhythm values 176 comprise Tempo value 152, Activity value 168, Time Signature value 166, Rhythm Description value 172, and Rhythm Type value 170. Zing values 178 comprise Weight value 154, Density value 158, Consonance value 164, and Melodic Movement value 160. Mood values 180 comprise Emotion value 182, Mood value 184, and Mood Description value 162. Twist values 182 comprise Vocals value 184, Flavor value 186, and Language value 188. Vocals value 184 comprises a plurality of names and descriptions of vocal elements of the composition. The Emotion value 182 indicates the amount of emotion expressed in the song. The Mood value 184 indicates the strength or power with which such emotion is expressed in the song.

Figure 2A:
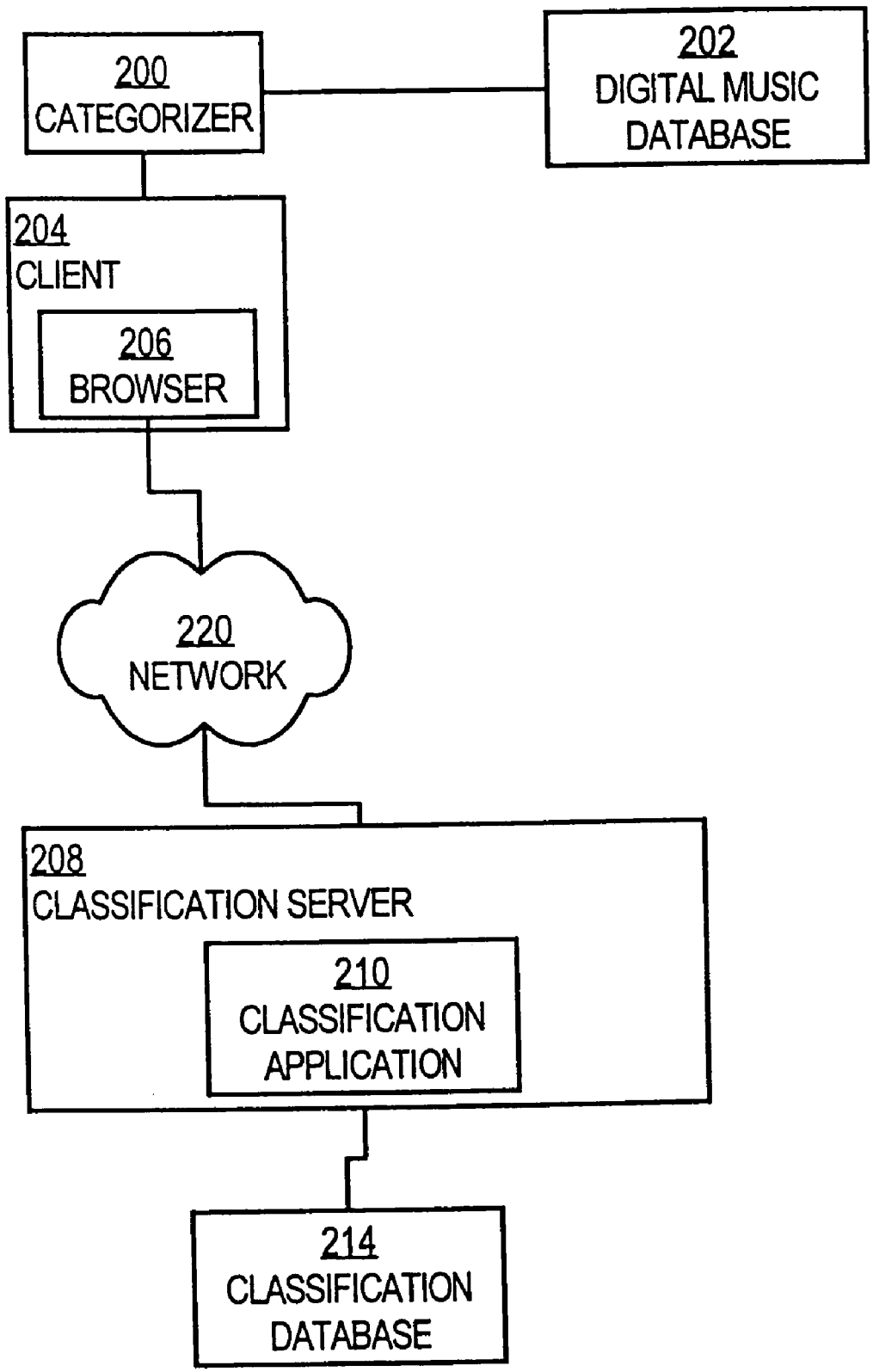
FIG. 2A is a block diagram of an information categorization system.

FIG. 2A is a block diagram of an information categorization system. In the context of musical compositions, the system of FIG. 2A typically is used in an offline or preparatory processing stage in which one or more categorizers listen to musical compositions, determine features of the musical compositions, and create and store song attribute values and voice attribute values based on the features of the musical compositions.

In this context, categorizer 200 has access to a music database 202. A categorizer 200 may be an individual person, or an automated process, that can listen to a musical composition that is stored in database 202, identify one or more features of the composition, and create and store attribute values based on the features. In the preferred embodiment, database 202 is a stored collection of digitized musical compositions or songs. Alternatively, database 202 is an audio reproduction device such as a compact disk player, tape deck, phonograph, etc. The precise characteristics of database 202 are not critical. What is important is that categorizer 200 has access to one or more musical composition for categorization.

Categorizer 200 is associated with a client 204 having a browser 206 that is coupled through network 220 to classification server 208. Client 204 is any computer end station device such as a workstation, personal computer, network computer, etc. Browser 206 is a computer program executed by client 204 that can retrieve and display pages of information from server 208, and submit attribute values and related information to server 208. In the preferred embodiment, client 204 is an Apple Macintosh® personal computer and browser 206 is a World Wide Web browser such as Netscape Navigator.

Network 220 is any communication system that can carry information from client 204 and browser 206 to classification server 208, for example, a local area network, Intranet, or the global packet-switched computer network known as the Internet. Alternatively, network 220 may be omitted and client 204 may be coupled directly to classification server 208.

Classification server 208 executes a classification application 210 and is coupled to a classification database 214. Classification application 210 is a computer program that interacts with client 204 and browser 206 to assist categorizer 200 in creating and storing attribute values for musical compositions of database 202, according to the methods and mechanisms described in this document. The resulting attribute values, and related information, are stored in classification database 214 for later retrieval and review, and for use in search and retrieval operations.

Classification database 214 is any non-volatile storage system that can store and permit retrieval of musical composition attribute values in an organized manner. Preferably, classification database 214 is a commercially available relational database system, such as the Oracle®, Sybase®, or SQL Server database systems. Classification database 214 is appropriately programmed with a pre-defined table schema that accepts and stores the attribute values described above in connection with FIG. 1A, FIG. 1B, FIG. 1C, and FIG. 1D, or FIG. 1E. In FIG. 2A, classification database 214 is illustrated as coupled directly to classification server 208, however, classification database 214 may be indirectly coupled to classification server 208 through a network, including network 220.

Classification database 214 is one example of a computer-readable medium comprising stored information that describes a first musical composition for use in selecting the first musical composition from among a plurality of other musical compositions that are similar to the first musical composition, in which the stored information comprises a plurality of classification values that distinguish among features of the musical compositions. Other forms of computer-readable media may store and carry the information that is illustrated in FIG. 1A, FIG. 1B, FIG. 1C, and FIG. 1D, or FIG. 1E, including tables, linked lists, stacks, etc. The precise format or form of classification database 214 or the associated computer readable media is not critical. What is important is that the information schema of FIG. 1A, FIG. 1B, FIG. 1C, and FIG. 1D, or FIG. 1E is established in computer-readable form, so that values can be stored in the schema for use in classifying a particular musical composition, determining its similarity to other compositions, and searching and retrieving the information.

In an alternate embodiment, classification database 214 comprises several separate databases that contain similar information, for the purpose of isolating new data from completed data that is available online for use in search and retrieval operations. For example, classification database 214 may comprise a development database, a production database, and a live database. New attribute information and other data records are added only to the development database as categorization occurs. When a categorization session is complete, the new information in the development database is copied to the production database. After testing or quality control operations are carried out on the production database, its contents are copied to the live database. The live database is used online to receive and respond to search and retrieval requests.

Moreover, the combination of classification application 210 and classification database 214 may also include a database interface layer, so that application 210, the interface layer, and database 214 are organized as a classical three-tier database application system.

Figure 3A:
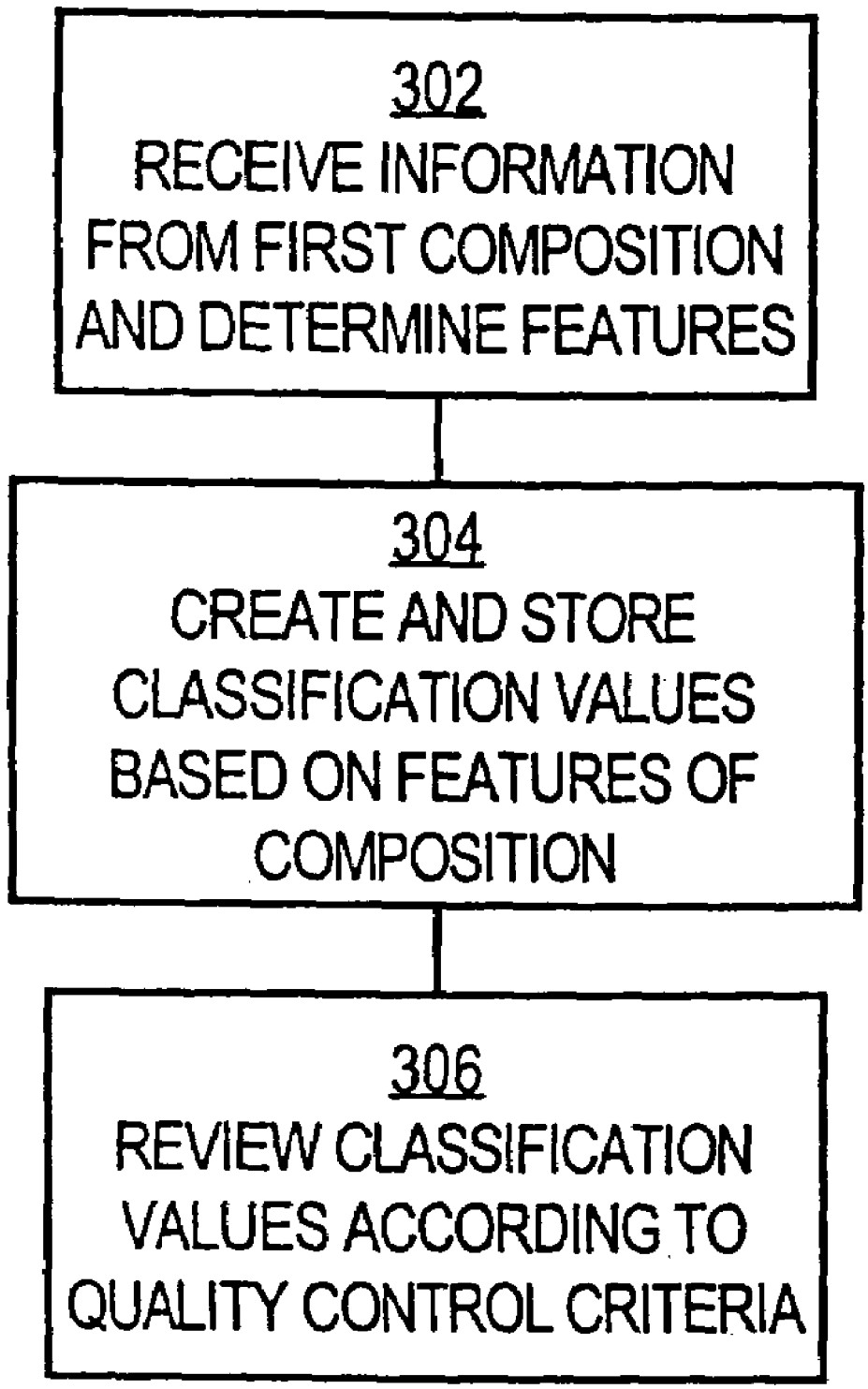
FIG. 3A is a flow diagram of a method of classifying information.

FIG. 3A is a flow diagram of a method of classifying information. In one embodiment, the method of FIG. 3A involves creating stored information that describes a first musical composition for use in selecting the first musical composition from among a plurality of other musical compositions that are similar to the first musical composition, according to a plurality of classification values that distinguish among features of similar kinds of musical compositions.

In block 302, musical information from the first musical composition is received and features of the musical composition are determined. Block 302 may involve audibly providing a musical composition to a categorizer, which listens to the musical composition and determines or identifies one or more features of the musical composition.

In block 304, a new set of the classification values for the first musical composition are created and stored based on the features that are determined. Block 304 may involve, for example, creating and storing values for a plurality of song attributes and voice attributes that are based on the features. The values may be entered into a database using a client that is coupled over a network to a server computer. The server computer executes a categorization application that involves generating forms and delivering the forms to the client. A categorizer fills in attribute values in fields of the forms, and returns the filled-in forms to the server computer. The server computer extracts the attribute values from the forms and stores the values in the database.

Alternatively, the values may be entered into a database or other non-volatile storage using a client computer that executes an appropriate computer program having fields for entering or storing values.

In the preferred embodiment, for each musical composition, the server computer generates and causes the client to present a form that accepts values of song attributes for one of a plurality of sections of the song. Alternatively, the form may accept values of song attributes for a song without using a plurality of sections.

FIG. 4A is a diagram of an exemplary graphical user interface 400 that may be used as a form to enter song attributes and voice attributes of a musical composition.

User interface 400 generally comprises a song information pane 402 and section pane 404. Song information pane 402 receives values that apply to a song as a whole whereas section pane 404 receives values that apply to a section of a song.

Song information pane 402 generally comprises an Artist field 406, Song field 408, Status field 410, Groover field 412, Date field 414, Flag field 416, Style field 418, Style Status field 420, Album field 422, Location field 424, ID field 426, and Key field 428. Artist field 406 receives a string value identifying the recording artist who created the song that is being classified. In the example of FIG. 4A, the artist is "U2." Song field 408 receives a string value identifying the name and length of the song that is being classified, for example, "October (2:20)." Status field 410 receives a value selected from a pull-down menu that indicates the status of the associated song record. Examples of Status values include Not Grooved, Grooved, Checked.

The term "groover" is sometimes used to refer to an individual who serves as a classifier of songs or as categorizer 200 and "to groove" refers to a process of classifying or classifying attributes of song. Groover field 412 receives a string value that identifies an individual who classified the current song. Date field 414 receives a date value that identifies the date and time at which the groover completed the grooving process.

Flag field 416 may comprise a plurality of check-box fields that flag characteristics of the current song. For example, flags may indicate that the song is in condition for classifying ("groovable"), has data errors or skips, contains explicit lyrics, or contains multiple musical sections within the piece.

Style field 418 receives a value selected from a pull-down menu that indicates the genre or style of the song. Examples of style values include Alternative Pop/Rock, Post-Punk, Funk, Motown, Pop Soul, or Vocal Soul, Style Status field 420 receives a value from a pull-down menu that indicates whether the value of the Style field 418 has been approved or reviewed by quality control personnel or processes. Examples of Style Status values include Not Yet Reviewed, Inaccurate, Accurate.

Album field 422 receives a string value that identifies an album or collection of which the current song or musical composition is a part. In an embodiment, Album field 422 receives a hyperlink which, when followed using a browser, displays a list of all songs that are associated with that album. Thus, a categorizer can rapidly move among related songs by selecting the Album hyperlink and then selecting another song from those on the album. Location field 424 receives a string value that identifies a file system directory or other network location of a digitized file that contains the current song or musical composition. In an embodiment, Location field 424 receives a hyperlink to the file. Accordingly, a categorizer can play back a song by selecting its hyperlink from user interface 400.

ID field 426 receives a sequence number or other identifier that is uniquely associated with the current section of the current song. Preferably, a value for ID field 426 is generated automatically by the system as new song sections are entered into the system. Key field 428 receives a sequence number or other identifier that is uniquely associated with the current song. Preferably, a value for ID field 426 is generated automatically by the system as new songs are entered into the system.

Section pane 404 generally comprises a section identifier 430, Rhythm pane 432, Zing pane 434, Mood pane 436, and Twist pane 438. Each of the Rhythm pane 432, Zing pane 434, Mood pane 436, and Twist pane 438 comprises a pane label 440, status field 442, and identifier field 444. Pane label 440 is a system-generated label that identifies the name of the pane. Status field 442 receives a value from a pull-down menu that indicates the status of quality control review of information in the associated pane. For example, in FIG. 4A Status field 442 has a value of Accurate," which indicates that the substantive values that have been entered in Twist pane 438 have been reviewed and are accurate. Identifier field 444 provides the name of the individual or groover who entered the values in the associated pane.

Rhythm pane 432 comprises a Tempo field 446, Activity field 448, Time Signature field 450, Description field 452, and Type field 454. Tempo field 446 receives a numeric value indicating the rate of speed of the musical composition. Activity field 448 receives a numeric value indicating the amount of activity that is involved in the rhythm. Time Signature field 450 receives a value from a pull-down menu of time signatures that are commonly used in recorded music, e.g., 4/4, 2/4, 9/8, etc. Description field 452 receives a value from a pull-down menu that indicates the nature of the rhythm of the song, such as Rockin', Frenetic, Steady, Throbbing, Free, Funky, Groovy, Syncopated, Stiff, etc. Type field 454 receives a value from a pull-down menu that indicates the type or style of rhythm, e.g., Straight 4, Shuffle, Swing, Disco, Reggae, or Hip Hop Shuffle.

Zing pane 434 comprises a Density field 456, Weight field 458, Consonance field 460, and Melodic Movement field 460. Density field 456 receives a numeric value that indicates the number of instruments present, and thus the fullness of the composition. Weight field 458 receives a numeric value that indicates the heaviness of the composition. Consonance field 460 receives a numeric value that indicates the resolution of the chords of the composition. Melodic Movement field 460 receives a numeric value that indicates the degree of movement of the main voice along the musical scale.

Mood pane 436 comprises an Emotion field 464, Mood field 466, and Mood Description field 468. Emotion field 464 receives a numeric value that indicates the amount of emotion expressed in the song. Mood field 466 receives a numeric value that indicates the strength or power with which such emotion is expressed in the song. Mood Description field 468 receives a numeric value that indicates the overall mood of the song, such as Dreamy, Soothing, Fun, Depressing, Angry, Lonely, Creepy, Groovy, Uplifting, Sexy, etc.

Twist panel 438 comprises a Vocals section 470, Flavor field 476, and Language field 478. The Vocals section comprises a plurality of Vocal fields 472, each associated with one of a plurality of Description fields 474. Each Vocal field receives a value that identifies a vocal element that is present in the current musical composition, selected from among a pull down menu of available kinds of vocal elements. Examples of kinds of vocal elements include Male Lead, Female Lead, Male Backup, Female Backup, Chorus, etc. Each Description field 474 receives a value that identifies the quality of the associated vocal element. Example values for Description field 474 include Raspy, Sweet, Sultry, Whiny, Forceful, Aggressive, Monotonous, Clear, Processed, Jangly, Shimmering, Thick, Thin, Lush, etc.

Flavor field 476 receives one or more values selected from among a list of flavor values that are displayed in the field and that indicate the cultural flavor of the song. Examples of flavor values include Latin, French, German, Asian, Indian, Irish, African, Caribbean, Middle Eastern, Native American, Western, Euro, etc. Language field 478 receives a value that indicates the language in which vocals (if any) in the song are sung.

Referring again to FIG. 3A, in block 306, the new set of classification values is reviewed based on quality control criteria. Block 306 may involve communicating the classification values from the database to a second categorizer other than the first categorizer that originally created and stored the classification values. The second categorizer reviews the classification values while concurrently listening to the musical composition that is the subject of the classification values. Preferably, the second categorizer is more experienced than the first categorizer. This procedure tends to improve uniformity and consistency of classification values as applied to different musical compositions. Moreover, the first categorizer receives rapid feedback about the accuracy of the values that have been selected by the first categorizer, thereby tending to train the first categorizer in a uniform manner.

Search and Retrieval

Another aspect of the invention relates to a search and retrieval system useful in locating information that has been classified and determining whether a particular set of information having subjective characteristics is objectively similar to another set of information.

Figure 2B:
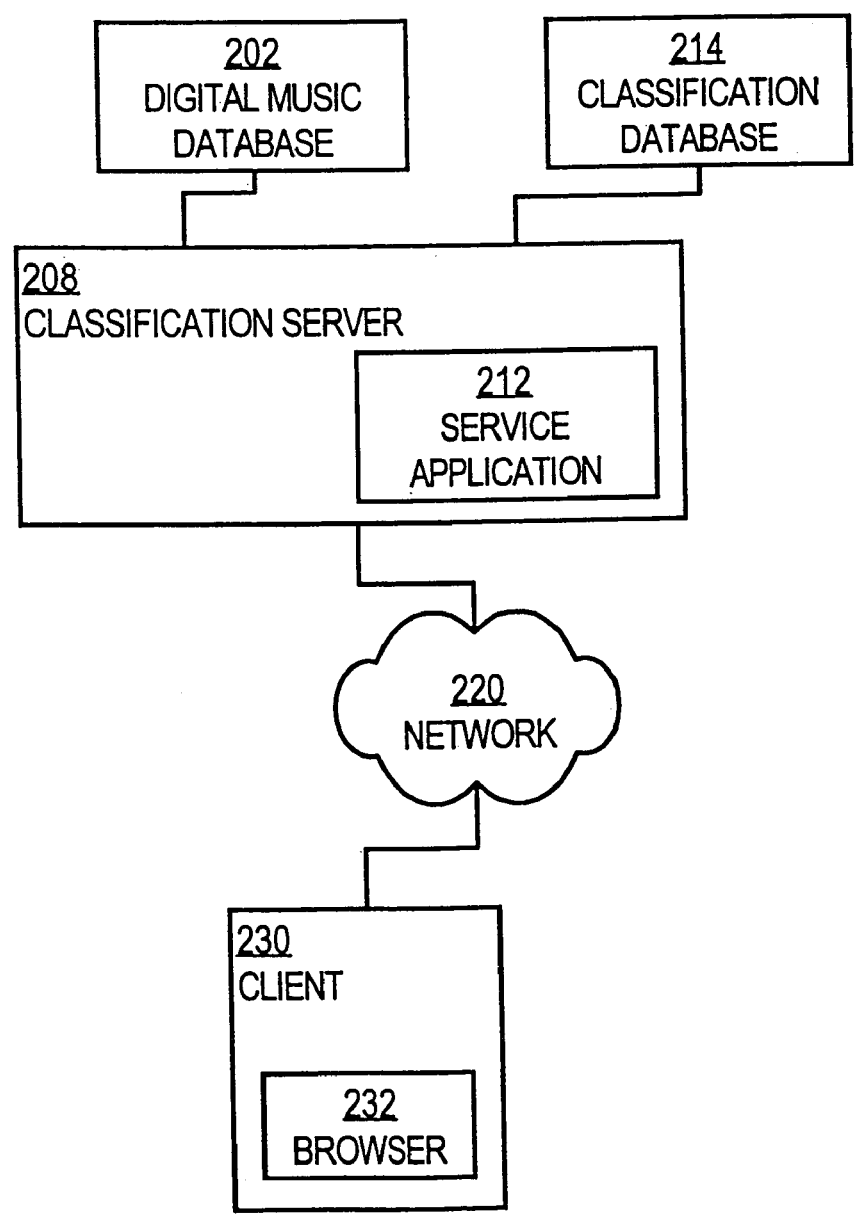
FIG. 2B is a block diagram of an information search and retrieval system.

FIG. 2B is a block diagram of an information search and retrieval system. In the context of musical compositions, the system of FIG. 2B typically is used in an online or production processing stage in which one or more clients request and retrieve information about musical compositions, based on features of the musical compositions and song attribute values or voice attribute values that have been previously created and stored by a categorizer.

In this context, digital music database 202 and classification database 214 are coupled to classification server 208, which executes a service application 212. A client 230 that executes a browser 232 is coupled through network 220 to classification server 208. One client 230 is shown as an example, however, any number of clients may connect to server 208 from any number of geographically distributed points.

Digital music database 202 has the same structure and format as described above in connection with FIG. 2A. Its use in the system of FIG. 2B is optional, and it is necessary only when the system plays back one or more musical compositions to the client in response to a search request. The system of FIG. 2B is equally useful for providing categorization information to the client in response to a search request, without also delivering music.

Classification database 214 has the same structure and format as described above in connection with FIG. 2A. When multiple databases are used for development, production, and live use, classification database 214 comprises the live database.

Service application 212 is a computer program executed by classification server 208 that receives information requests from client 230, formats and submits queries to classification database 214, processes received results into presentable data, and returns the presentable data to client 230. Service application 212 may use the particular mechanisms described in this document, and may have other features and functions.

Figure 3B:
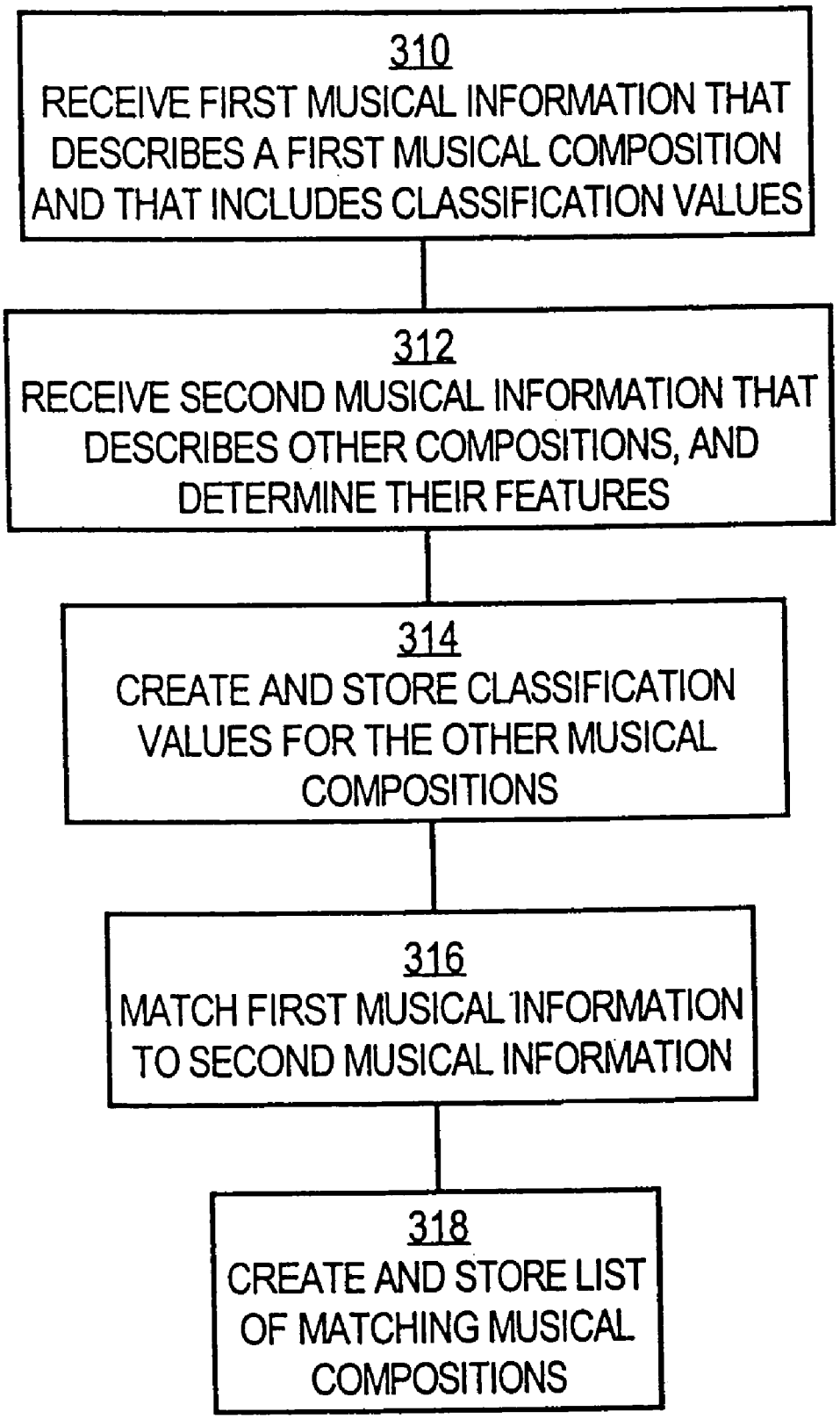
FIG. 3B is a flow diagram of a method of retrieving information.

FIG. 3B is a flow diagram of a method of retrieving information. Generally, FIG. 3B provides method of matching information that describes a first musical composition to stored information that describes a plurality of other musical compositions that are similar to the first musical composition. The stored information comprises a plurality of classification values that distinguish among features of similar kinds of musical compositions. Thus, the method may be used to find one or more musical compositions that are similar to a first musical composition.

In block 310, first musical information that describes the first musical composition and that includes a first set of classification values based on features of the first musical composition is received. Block 310 may involve receiving classification values for a musical composition that is "liked" by a user, or for which the user wishes to find a similar musical composition. Alternatively, block 310 may involve receiving search criteria that does not necessarily identify a particular existing musical composition but represents characteristics of a musical composition that a user wishes to retrieve.

In block 312, second musical information that describes the plurality of other musical compositions is received, and features of the other musical compositions are determined. Block 312 may involve accessing and listening to a musical composition, and determining its features, in the manner described above. In block 314, a second set of the classification values for the plurality of other musical compositions are created and stored, based on the features that are determined. Block 314 may involve defining and storing classification values in the manner described above.

In block 316, the first musical information is matched to the second musical information based on the classification values.

In one embodiment, block 316 involves carrying out a weighted matching. Each of the classification values may be weighted using a pre-defined weight value prior to carrying out the matching step. Alternatively, each of the classification values may be weighted based on prior matches of the first musical composition to other musical compositions that are associated with a particular client prior to carrying out the matching step. In another embodiment, the matching step comprises computing a difference value of each a pair of associated classification values of the first information and the second information, computing a square of the difference values, and computing a sum of the differences. Difference values that are within a pre-defined threshold are deemed to be the same for matching purposes.

Preferably, the matching step involves matching a plurality of pairs of associated classification values for each musical composition. Any number of pairs of classification values may be used as input to the matching process. Values may be combined in Boolean expressions. For example, a user can request songs that have high density with a heavy beat. Further, matching need not involve finding identity of all pairs of classification values. Matching may occur when a pre-determined subset of classification values is similar. Alternatively, matching may occur when a pre-determined subset of classification values is similar provided that no one pair of values is too different, according to a pre-determined threshold value.

In still another alternative embodiment, the matching step involves matching the musical compositions by additionally using pre-defined metadata that defines one of the voices in a first composition as similar to a second voice in the second composition. For example, the metadata may indicate that a saxophone is similar to a clarinet. When a first composition has a saxophone voice that has voice attribute values similar to the voice attribute values of the clarinet voice of a second composition, a match is found.

The metadata may comprise a binary voice table that is N by M rows and columns in size, where N=M and represent the number of possible voices. When a cell in the table is set or TRUE, then instrument N is similar to instrument M Alternatively, the table stores integer values that represent a degree of similarity or weight among two voices. A saxophone voice and a clarinet voice may have a relatively high similarity value, indicating close similarity, whereas the saxophone voice and a drum voice may have a relatively low similarity values, indicating difference among the voices.

In block 318, a list of one or more matching musical compositions is created and stored. The matching musical compositions are selected from among the plurality of other musical compositions based on the matching step of block 316.

FIG. 4B is a diagram of an exemplary graphical user interface that may be used as a form to edit default classification attribute values. In one embodiment, the graphical user interface of FIG. 4B is generated by a general-purpose factor editor, which forms a part of classification application 210. The factor editor may be used to retrieve, review, and set values of various parameters that are used by the system of FIG. 2A, FIG. 2B and that are used as input in the graphical user interface of FIG. 4A. The editor may be used to enter actual factor values, or weight values.

A factor set field 480 provides a pull-down menu that maybe used to select one of a plurality of sets of factors. A user may pull down the menu, choose a factor set name, and activate the selection by selecting the Select button 482. In the example of FIG. 4B, a Default factor set has been selected. In response to activation of the Select button 482, classification application 210 displays a factor column 486 comprising a plurality of factor labels 486A, 486N, etc., and a value column 488 comprising a plurality of values 488A, 488N, etc. There maybe any number of labels and associated values.

The user may then change one or more of the values 488A, 488N, etc. The entered changes may be made persistent in the system database by selecting an Update Factor Set Default button 490. Thereafter, the changed values are used as default classification values in the graphical user interface of FIG. 4A.

Applications, Alternatives and Extensions

The list that is created and stored in block 318 of FIG. 3A may be used for a variety of useful purposes. For example, the list may be used in an electronic commerce system to suggest a set of musical compositions that a prospective purchaser may like or wish to purchase, based on liking a first musical composition.

In an embodiment, the method may involve suggesting a second musical composition that may be similar to the first musical composition by successively carrying out the matching step a plurality of times for a plurality of matching compositions, each of which is slightly different from the previous composition.

In another embodiment, the list is used directly to play a song that is similar to a song that the client or user knows and likes. In this embodiment, the method further comprises the selecting and audibly playing one of the musical compositions from a stored collection of the musical compositions based on the list. For example, in the system of FIG. 2B, the user may receive a hyperlinked list of musical compositions that are accessible in digital music database 202. The user may select one of the compositions by selecting its hyperlink. In response, the system retrieves the selected composition and plays it using suitable audio circuitry and loudspeakers that are coupled to the user's computer system.

The foregoing method steps may be implemented in the form of one or more computer programs that form service application 212. In one embodiment, service application 212 is not directly accessible to clients of end users, but comprises a back end search and retrieval system that is accessible to clients through an application program interface (API). In this embodiment, a client application of an end user or enterprise issues requests to service application 212 over a network such as the Internet in the form of function calls that conform to the API. Requests may be carried in the payload of an HTTP request that is delivered from the client over the World Wide Web to the service application. Service application 212 parses each request and calls internal subroutines or functions as necessary to carry out the functions that are defined in the API. Service application creates and forwards a response message to the requesting client.

In still another alternative, classification database 214 is delivered as a stand-alone product to an enterprise that provides search and retrieval services. The enterprise uses its own front-end clients or other elements to interface to and communicate with database 214.

Still other alternative embodiments do not require use of an intermediate network or the Internet. For example, the foregoing structures and functions are applicable to an interactive radio application. In this application, the classification database 214 stores information that describes subjective characteristics about radio stations that are accessible in a particular geographic area. The characteristics may relate to format or other aspects of a station. Using appropriate user interface controls or software, a user can select a desired radio station by entering criteria such as rhythm, zing, mood, and twist attributes.

Another alternative embodiment applies the foregoing structures and functions to a personal juke box system. In this embodiment, a user has a set of compact disks or other stored musical compositions, such as a collection of songs encoded using MP3 or another digital encoding format. Classification database 214 includes information only for the songs and albums in the user's collection. The user executes a search and retrieval client program at a desktop computer. The user enters search criteria that comprise one or more of the classification values. The client program searches the classification database 214 for a song matching criteria that are entered by the user and displays a list. The user selects one song from the list. The client program retrieves the corresponding MP3 file or compact disk from the user's collection and plays it using appropriate circuitry and loudspeakers that are coupled to the computer.

In an extension of this alternative, based on the search results, or in addition, the client program connects the user's computer to the Internet to a system of the type shown in FIG. 2B. The client program then submits a search request containing the search criteria to the service application 212. Search results are retrieved and displayed to the user. This extension also may be used in an e-commerce system. The service application 212 maybe associated with an online merchant that sells pre-recorded musical recordings. The search criteria are used to identify and display musical recordings that are similar to the search criteria and that the user may wish to purchase. The user may then link to transactional pages that carry out a purchase transaction for one or more recordings in the list.

In still another extension of the foregoing alternative, the service application 212 retrieves and delivers educational information to the user, along with a list of matching search results. This extension provides a complete library and education system in which matching information is delivered along with associated information that enhances the matching information and educates the client or user regarding the matching information.

Hardware Overview

Figure 5:
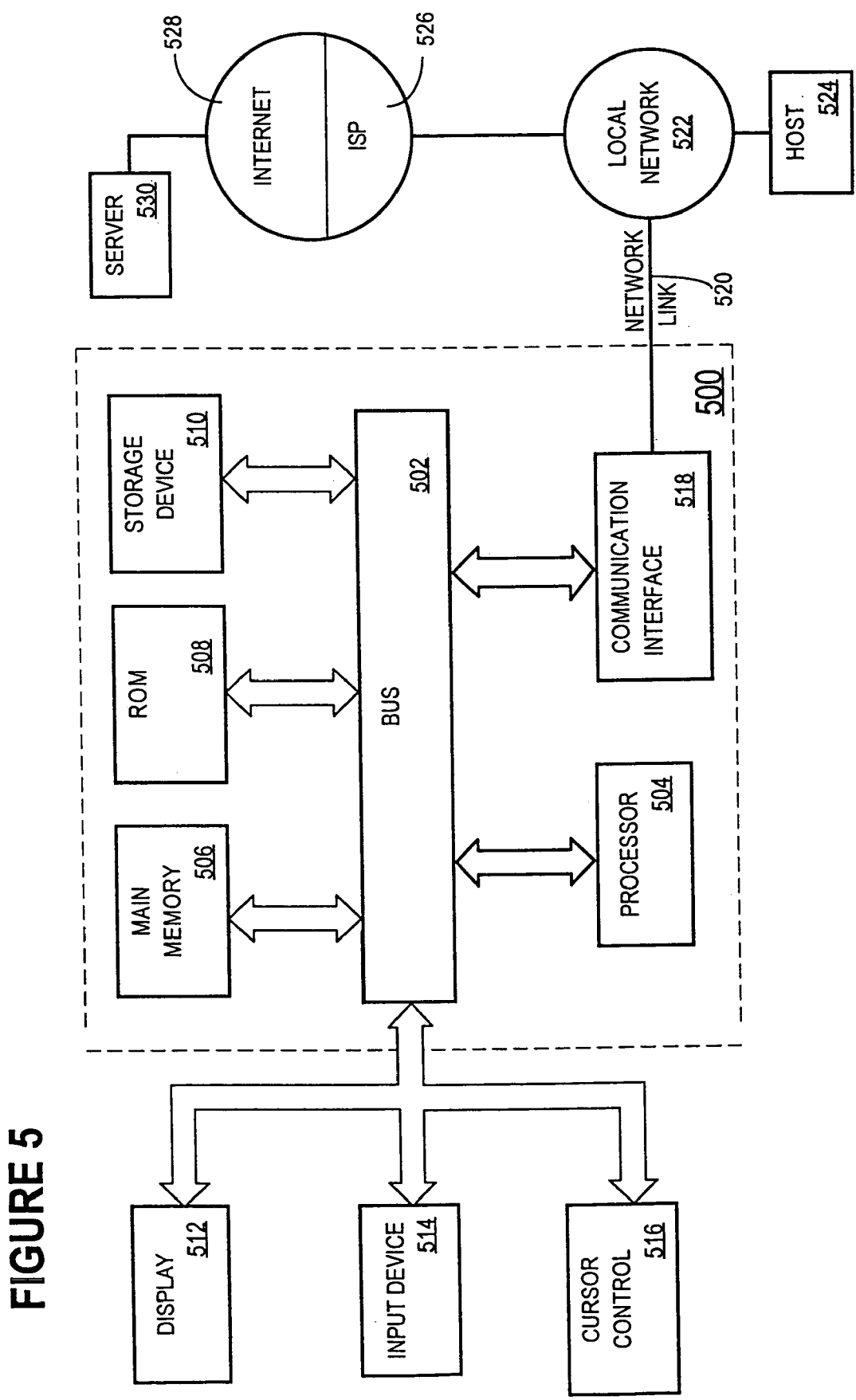
FIG. 5 is a block diagram of a computer system with which an embodiment may be used.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are implemented by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 maybe a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application implements the techniques described herein.

The received code maybe executed by processor 504 as it is received, and/or stored in storage device 510, or other non-volatile storage for later execution. In this manner, computer system 500 may obtain application code in the form of a carrier wave.

SCOPE

Thus, methods and mechanisms for classifying information and searching and retrieving information have been disclosed. The methods and mechanisms may be used to classify distinguishing features of similar kinds of information, such as musical compositions. The approach is efficient and relies on a minimally necessary set of classification values, however, advantageously, a sufficient number of qualitative characteristics of the information are classified and assigned values. Lead voices of a composition are identified and classified, thereby improving the accuracy of similarity comparisons. Resulting classification data is collapsed and subjected to quality control measures in order to improve its consistency. The structure of the data schema helps enforce quality control measures.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-readable storage medium having stored thereon computer executable instructions for performing steps comprising:
   selecting a first musical composition from among a plurality of musical compositions based on information that describes the plurality of musical compositions;
   and displaying an identification of the first musical composition,
   wherein the information comprises a plurality of classification values, each corresponding to a particular subjective feature of the plurality of musical compositions, the plurality of classification values being weighted with respect to one another such that the first musical composition is selected based, at least in part, on a weight of each of the plurality of classification values,
   wherein the information further comprises a binary voice table to assist in selecting the first musical composition from among the plurality of musical compositions, the binary voice table having an equal quantity of rows and columns along an x and a y axis, one of the axes listing voices in the first musical composition, and another of the axes listing voices in one of the plurality of musical compositions, each voice being a discrete sound in a corresponding musical composition, each cell of the binary voice table including a value that indicates a similarity between a voice in a corresponding column and a voice in a corresponding row.

2. A computer-readable storage medium as recited in claim 1, wherein the classification values comprise at least one song attribute.

3. A computer-readable storage medium as recited in claim 2, wherein the song attribute comprises at least one song attribute value indicating Weight, Intensity, Chord Movement, Range, Harmony, Density, Expressiveness, Flow, Melodic Movement, Mood Description, Consonance, Mood, Dynamics, Language, Ethnic Flavor, or Style.

4. A computer-readable storage medium as recited in claim 2, wherein the song attribute comprises at least one song attribute value indicating Flexibility, Beat, Time Signature, Rhythm Type, or Rhythm Description, or Tempo.

5. A computer-readable storage medium as recited in claim 2, wherein the song attribute comprises at least one rhythm type value having a value of Straight 4, Shuffle, Swing, Disco, Reggae, or Hip Hop Shuffle.

6. A computer-readable storage medium as recited in claim 2, wherein the song attribute comprises at least one rhythm description value having a value of Rockin', Frenetic, Steady, Throbbing, Free, Funky, Groovy, Syncopated, or Stiff.

7. A computer-readable storage medium as recited in claim 1, wherein each voice has an associated voice description that is at least one of Raspy, Sweet, Sultry, Whiny, Forceful, Aggressive, Monotonous, Clear, Processed, Jangly, Shimmering, Thick, Thin, or Lush.

8. A computer-readable storage medium as recited in claim 1, wherein the classification values comprise a mood value of Dreamy, Soothing, Fun, Depressing, Angry, Lonely, Creepy, Groovy, Uplifling, Sexy, Rockin', or Neutral.

9. A computer-readable storage medium as recited in claim 1, wherein each voice is associated with a plurality of voice attributes of Range, Intensity, Cleanliness, Rhythmic Activity, or Melodic Movement.

10. A computer-readable storage medium as recited in claim 1, wherein each voice is associated with a plurality of voice attributes of Prominence, Ornamentation, Beat, Presence, or Flow.

11. A computer-readable storage medium as recited in claim 1, wherein each voice is associated with a plurality of voice attributes of Range, Intensity, Cleanliness, Rhythmic Activity, or Melodic Movement.

12. A computer-readable storage medium as recited in claim 1, wherein a first voice is associated with a harmony value that identifies a second voice with which the first voice harmonizes.

13. A graphical user interface useful for selecting a first musical composition from among a plurality of musical compositions based on stored information that comprises a plurality of classification values that distinguish among features of the plurality of musical compositions, the graphical user interface comprising a plurality of fields that are used to select a particular value for each of the classification values and to assign a weight to each of the classification values such that the first musical composition is selected based, at least in part, on each weight, the graphical user interface further displaying an identification of the selected first musical composition, wherein the stored information further comprises a binary voice table to assist in selecting the first musical composition from among the plurality of musical compositions, the binary voice table having an equal quantity of rows and columns along an x and a y axis, one of the axes listing voices in the first musical composition, and another of the axes listing voices in one of the plurality of musical compositions, each voice being a discrete sound in a corresponding musical composition, each cell of the binary voice table including a value that indicates a similarity between a voice in a corresponding column and a voice in a corresponding row.

14. A method for recognizing a first musical composition using a binary voice table, the method comprising:

selecting the first musical composition from among a plurality of musical compositions based on information that describes the plurality of musical compositions; and displaying an identification of the first musical composition, wherein the information comprises a plurality of classification values, each corresponding to a particular subjective feature of the plurality of musical compositions, the plurality of classification values being weighted with respect to one another such that the first musical composition is selected based, at least in part, on a weight of each of the plurality of classification values, wherein the information further comprises a binary voice table to assist in selecting the first musical composition from among the plurality of musical compositions, the binary voice table having an equal quantity of rows and columns along an x and a y axis, one of the axes listing voices in the first musical composition, and another of the axes listing voices in one of the plurality of musical compositions, each voice being a discrete sound in a corresponding musical composition, each cell of the binary voice table including a value that indicates a similarity between a voice in a corresponding column and a voice in a corresponding row.

15. The method of claim 14, wherein each voice has an associated voice description that is at least one of Raspy, Sweet, Sultry, Whiny, Forceful, Aggressive, Monotonous, Clear, Processed, Jangly, Shimmering, Thick, Thin, or Lush.

16. The method of claim 14, wherein the classification values comprise a mood value of Dreamy, Soothing, Fun, Depressing, Angry, Lonely, Creepy, Groovy, Uplifting, Sexy, Rockin', or Neutral.

17. The method of claim 14, wherein each voice is associated with a plurality of voice attributes of Range, Intensity, Cleanliness, Rhythmic Activity, or Melodic Movement.

18. The method of claim 14, wherein each voice is associated with a plurality of voice attributes of Prominence, Ornamentation, Beat, Presence, or Flow.

19. The method of claim 14, wherein each voice is associated with a plurality of voice attributes of Range, Intensity, Cleanliness, Rhythmic Activity, or Melodic Movement.

20. The method of claim 14, wherein a first voice is associated with a harmony value that identifies a second voice with which the first voice harmonizes.

* * * * *